(12) United States Patent
Maeda

(10) Patent No.: US 7,894,085 B2
(45) Date of Patent: Feb. 22, 2011

(54) IMAGE FORMING APPARATUS AND METHOD OF CONTROLLING SAME

(75) Inventor: Tadaaki Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1184 days.

(21) Appl. No.: 11/526,614

(22) Filed: Sep. 26, 2006

(65) Prior Publication Data

US 2007/0146775 A1   Jun. 28, 2007

(30) Foreign Application Priority Data

Oct. 7, 2005   (JP) ............................. 2005-295556

(51) Int. Cl.
- *G06K 15/22* (2006.01)
- *G06K 15/10* (2006.01)
- *G06F 1/00* (2006.01)
- *G06F 1/26* (2006.01)
- *G06F 1/32* (2006.01)

(52) U.S. Cl. ................ 358/1.13; 713/300; 713/310; 713/320; 713/322; 713/323; 713/324; 713/330

(58) Field of Classification Search ............... 358/1.15, 358/1.13; 713/300, 310, 320, 321, 322, 323, 713/324, 330, 340

See application file for complete search history.

(56) References Cited

U.S. PATENT DOCUMENTS

| | | | |
|---|---|---|---|
| 6,711,691 B1 * | 3/2004 | Howard et al. | .............. 713/300 |
| 6,763,473 B1 * | 7/2004 | Oteki et al. | ................. 713/324 |
| 6,791,703 B1 | 9/2004 | Maeda et al. | |
| 6,885,472 B1 | 4/2005 | Konno et al. | |
| 6,925,574 B2 * | 8/2005 | Satoh | .......................... 713/323 |
| 6,993,669 B2 * | 1/2006 | Sherburne, Jr. | ............. 713/322 |

(Continued)

FOREIGN PATENT DOCUMENTS

JP   7-081186   3/1995

(Continued)

OTHER PUBLICATIONS

Japanese Office Action dated Nov. 13, 2009 concerning Japanese Patent Application No. 2005-295556.

(Continued)

*Primary Examiner*—King Y Poon
*Assistant Examiner*—Vincent R Peren
(74) *Attorney, Agent, or Firm*—Fitzpatrick, Cella, Harper & Scinto

(57) ABSTRACT

A image forming apparatus 100 has a network interface 103 for receiving data transmitted from an external apparatus, and a control unit 102 for interpreting content of data received by the network interface 103. The image forming apparatus 100 further has a printing unit 101 for executing print processing based upon print data if print data has been received by the network interface 103, and a restoration control unit 107 for exercising control so as to place the control unit 102 in an active state or inactive state. The restoration control unit 107 of the image forming apparatus 100 starts supplying a low-speed clock to the control unit 102 in the inactive state in response to receipt of data by the network interface 103, and starts supplying a high-speed clock in response to an interpretation by the control unit 102 that the content of the data is print data.

8 Claims, 7 Drawing Sheets

U.S. PATENT DOCUMENTS

| | | |
|---|---|---|
| 7,057,754 B1 | 6/2006 | Tsuchiya et al. |
| 2002/0007464 A1* | 1/2002 | Fung .................... 713/320 |
| 2003/0140260 A1* | 7/2003 | Kizawa et al. ........... 713/300 |
| 2003/0197886 A1* | 10/2003 | Fujinaga et al. ......... 358/1.14 |
| 2004/0004732 A1* | 1/2004 | Takeda et al. ........... 358/1.13 |
| 2004/0163005 A1* | 8/2004 | Kardach et al. .......... 713/323 |
| 2005/0007628 A1* | 1/2005 | Yamano et al. .......... 358/1.15 |
| 2005/0108584 A1* | 5/2005 | Kawakami et al. ........ 713/300 |
| 2005/0128515 A1* | 6/2005 | Ohno .................. 358/1.15 |
| 2006/0187480 A1 | 8/2006 | Tsuchiya et al. |
| 2007/0146775 A1 | 6/2007 | Maeda |

FOREIGN PATENT DOCUMENTS

| | | |
|---|---|---|
| JP | 8324071 | 12/1996 |
| JP | 10-193750 | 7/1998 |
| JP | 2001180083 | 7/2001 |
| JP | 2004-148569 | 5/2004 |

OTHER PUBLICATIONS

Office Action, dated May 9, 2008, in CN 200610141053.0.

* cited by examiner

FIG. 6

| INPUT SIGNAL | SET OPERATING MODE | POWER SUPPLY COMMAND SIGNAL (113) | CLOCK SELECTION SIGNAL (114) |
|---|---|---|---|
| RESTORATION REQUEST SIGNAL 116 (FROM LAN I/F 103) | PRINT MODE | POWER 110: ON<br>POWER 111: OFF | LOW-SPEED |
| RESTORATION REQUEST SIGNAL 117 (FROM USB I/F 104) | | POWER 110: ON<br>POWER 111: ON | HIGH-SPEED |
| | STORAGE MODE | POWER 110: ON<br>POWER 111: OFF | |
| RESTORATION REQUEST SIGNAL 118 (FROM CONSOLE 105) | | POWER 110: ON<br>POWER 111: ON | HIGH-SPEED |

IMAGE FORMING APPARATUS AND METHOD OF CONTROLLING SAME

BACKGROUND OF THE INVENTION

1. Field of the Invention

The present invention relates to an image forming apparatus and to a method of controlling this apparatus.

2. Description of the Related Art

An image forming apparatus such as a copier or multifunctional peripheral generally comprises a plurality of subsystems such as a main controller for controlling the overall image forming apparatus, a scanner for reading in an image and a printer for forming an image on paper. It has become commonplace, in recent years for such an image forming apparatus to be connectable to a network. A network-connected image forming apparatus receives print data, which has been transmitted from a plurality of personal computers or servers, via a network, and performs printing in accordance with the print data received.

Further, if the image forming apparatus is not issued an operation request in excess of a fixed period of time, control is exercised to automatically cut off the supply of power to the scanner or printer and effect a transition to a power save mode in order to reduce power consumption. Generally, in the power save mode, the supply of power to the main controller is maintained. Control is exercised by the main controller in response to an input of a prescribed signal in such a manner that the image forming apparatus is restored from the power save mode to the normal power supply state.

In order to achieve a further power saving, it has been proposed to perform finer control of power even in the main controller, supply power only to a communication control unit that accepts communication from external equipment and cut off supply of power to other controllers. In this case, since power is supplied to the communication control unit, supply of power to the entirety of the main controller can be started in response to a communication request from external equipment and the communication request can be processed.

An overview of a power saving operation in an ordinary image forming apparatus of the above-described kind is illustrated in FIG. 7. In FIG. 7, step S1000 represents a standby state in a normal mode. Step S1000 represents a state in which the apparatus awaits a processing request such as a print request from outside the image forming apparatus or from a console. In a case where the setting is such that a transition is made to the power save mode if there is no processing request over a fixed period of time, a timer for measuring the length of time over which there is no input signal (processing request) from the outside operates within the apparatus. If a processing request of some kind is issued, control proceeds to step S1001, where the requested processing is executed, and then returns to step S1000. At this time, the value measured by the timer that measured the length of time without a processing request is cleared and measurement is re-started from the moment the requested processing ends.

In the standby state (i.e., during the absence of a processing request), reference is had to the timer value at step S1002 and it is determined whether a transition to the power save mode should be made. If it is determined that there will be no transition to the power save mode (i.e., if the timer value has not attained a prescribed time), then control returns to step S1000.

The above-described processing is repeated. If it is determined at step S1002 that a transition is to be made to the power save mode (i.e., if the timer value indicates elapse of the prescribed time), then processing for transitioning to the power save mode is executed at step S1003. For example, processing for saving necessary data from a DRAM to a non-volatile storage medium such as a hard disk is executed and supply of power to part of the apparatus is halted. Control then proceeds to step S1004. This step represents the standby state in the power save mode. As mentioned above, in this state part of the power supply is shut down and power consumption is reduced. In the power save mode, power is supplied at least to the communication control unit of the main controller. Issuance of a new processing request is monitored at step S1004. If a new processing request is issued, control proceeds to step S1005, at which the power save mode is terminated. That is, supply of power is resumed to the components to which supply of power was stopped and a transition is made from the power save mode to the normal mode. At step S1001, the apparatus operates in the standby state in the normal mode after the processing in response to the processing request is executed.

A variety of processing requests are issued to the network-connected image forming apparatus. For example, a client personal computer on the network periodically transmits a communication request for monitoring whether or not the image forming apparatus is in a state in which it is capable of printing. If the image forming apparatus is operated normally whenever there is such a request, the length of time during which the apparatus is in the power save mode is shortened and the power-saving effect is diminished. Methods set forth below have been proposed as methods of solving this problem.

The specification of Japanese Patent Application Laid-Open No. 8-324071 describes an image forming apparatus in which, when the power save mode is in effect, power is supplied only to a communication control unit and is cut off from other controllers, printer and scanner. Japanese Patent Application Laid-Open No. 8-324071 is such that if a communication request from external equipment is detected, the communication control unit determines whether or not to supply power to other controllers, printer and scanner based upon the communication request. Supply of power to each of the components is resumed in accordance with the result of this determination.

Further, the specification of Japanese Patent Application Laid-Open No. 2001-180083 describes a power-saving technique in a printing apparatus having first communication interfaces connected to external equipment in 1:1 correspondence, and a second communication interface connected in common with a plurality of items of external equipment. Japanese Patent Application Laid-Open No. 2001-180083 is such that if the first communication interfaces have been connected, a power supply of control means is cut off when the power save mode is in effect. Further, if the second communication interface has been connected, the operating blocks of the control means are shut down without cutting off power to the control means when the power save mode is in effect.

In Japanese Patent Application Laid-Open No. 8-324071, however, the communication control unit monitors whether information as to whether supply of power should be started is monitored is received at all times. Even in the power save mode, therefore, it is necessary to supply power at all times to a CPU, ROM and RAM, etc., that construct the communication control unit. A problem, therefore, is that a comparatively large amount of power is consumed.

Further, Japanese Patent Application Laid-Open No. 2001-180083 is such that when the apparatus has been connected to a network (second communication interfaces), a clock is halted but power continues to be supplied. Power is consumed as a result. Demand for power saving has grown more intense in recent years. Even if circuits cease operating (even though the clock is halted), leakage current consumed by the circuits is not negligible.

Furthermore, the Japanese Patent Application Laid-Open No. 2001-180083 is such that if data of some kind is received from the network, the content of the received data is analyzed and it is determined whether to restore operation from the power save mode. The clock of the control unit such as a CPU is resumed in order to accomplish this. Accordingly, if reception of data from the network is performed frequently, the controller is almost always in the normal operating mode. Ultimately, consumption of power in the power save mode is great, just as in the case of Japanese Patent Application Laid-Open No. 8-324071.

SUMMARY OF THE INVENTION

Accordingly, an object of the present invention is to provide an improved image forming apparatus and method of controlling same.

Another object of the present invention is to provide an image forming apparatus and method of controlling same in which the power-saving effect is enhanced by so arranging it that a transition from the power save mode to the power supply mode is performed more appropriately.

According to one aspect of the present invention, there is provided an image forming apparatus comprising: a first receiving unit adapted to receive data transmitted from an external apparatus; an interpreting unit adapted to interpret content of data received by the first receiving unit; a printing unit adapted to execute print processing based upon print data if the print data has been received by the first receiving unit; and an operating-status control unit adapted to execute control in such a manner that the interpreting unit is placed in an active state or inactive state, wherein in response to receipt of data by the first receiving unit, the operating-status control unit causes the interpreting unit, which is in the inactive state, to transition to a first operating state, and causes the interpreting unit to transition from the first operating state to a second operating state, in which power consumption is greater, in response to an interpretation by the interpreting unit that content of the data is print data.

Furthermore, according to another aspect of the present invention, there is provided a method of controlling an image forming apparatus having interpreting unit adapted to interpret content of-data received from an external apparatus, and printing unit adapted to execute print processing based upon print data received from the external apparatus, the method comprising: a receiving step of receiving data transmitted from the external apparatus; a first transition step of causing the interpreting unit, which is in the inactive state, to transition to a first operating state in response to receipt of data at the receiving step; a determination step of determining whether content of the data received at the receiving step is print data using the interpreting unit; and a second transition step of causing the interpreting unit to transition from the first operating state to a second operating state, in which power consumption is greater, if it has been determined at the determination step that content of the data is print data.

Further features of the present invention will become apparent from the following description of exemplary embodiments (with reference to attached drawings).

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 6 is a diagram useful in describing operation of a restoration control unit in accordance with the embodiment of the present invention.

DESCRIPTION OF THE EMBODIMENT

The present invention will now be described in detail with reference to the drawings showing an embodiment thereof.

Figure 1:
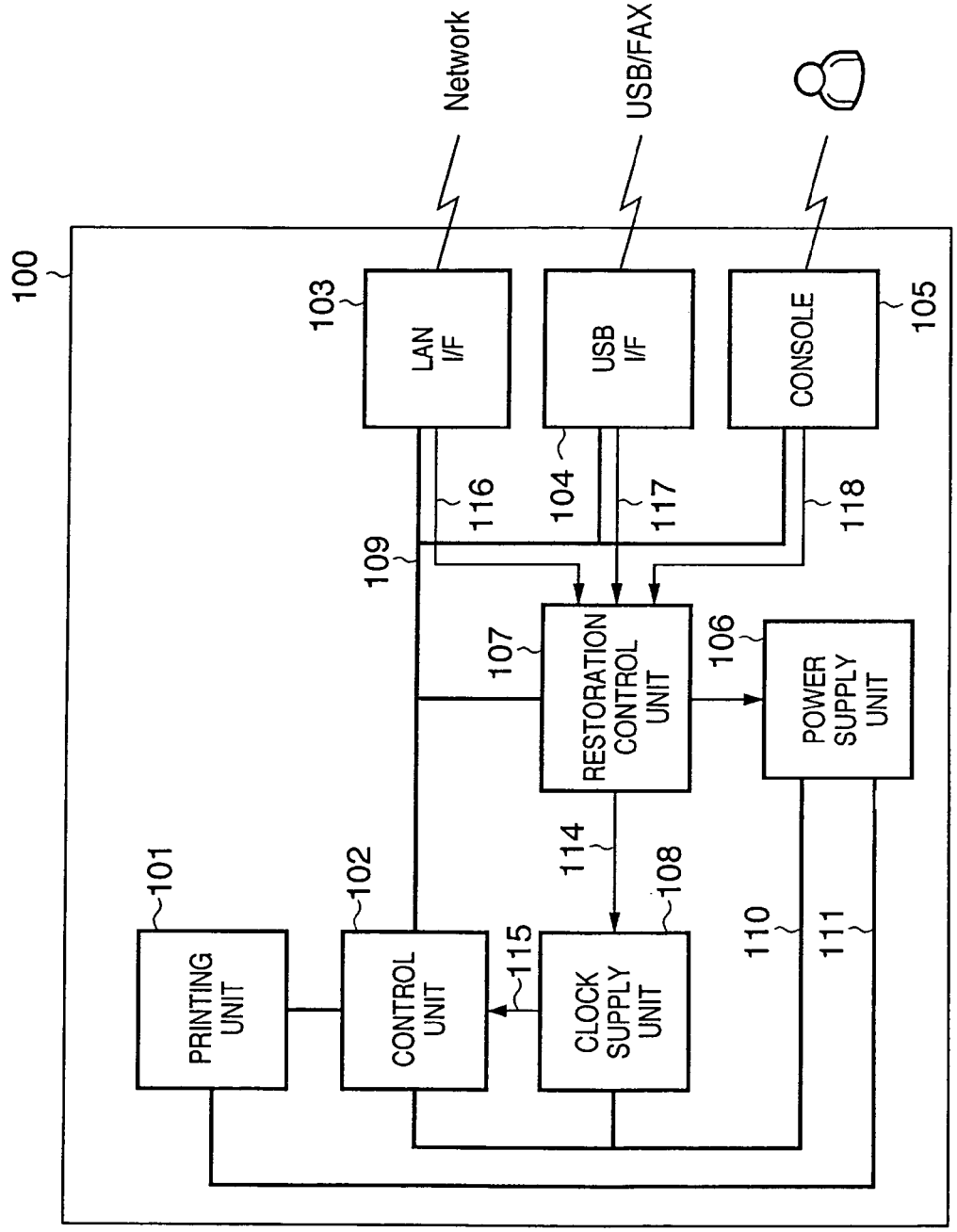
FIG. 1 is a block diagram illustrating the structure of an image forming apparatus in accordance with one embodiment of the present invention.

FIG. 1 is a block diagram illustrating the structure of an image forming apparatus (printing apparatus) according to an embodiment of the present invention. As shown in FIG. 1, an image forming apparatus 100 includes a printing unit 101 for printing an image on paper, a control unit 102 for controlling the overall apparatus, and a power supply unit 106 for supplying power to each component of the apparatus. The apparatus further includes a network interface 103 (e.g. LAN I/F), a serial interface 104 (e.g. USB I/F) and a console 105 for interfacing external equipment or the user. Signals from outside the apparatus are received by the image forming apparatus 100 via any of the plurality of interfaces 103 to 105.

A restoration control unit 107 outputs a drive command signal to the power supply unit 106 and to a clock supply unit 108 in accordance with detection signals from the interfaces 103, 104, 105, namely restoration request signals 116, 117, 118. The restoration control unit 107 causes the image forming apparatus 100 to recover from the power save mode in accordance with a detection signal that has been output from at least one of the interfaces 103 to 105. At this time the restoration control unit 107 changes over the restoration operation in dependence upon which interface has issued the signal. The clock supply unit 108 changes over between a high-speed clock and low-speed clock in accordance with a clock selection signal 114 from the restoration control unit 107. The power supply unit 106 changes over the power supply destination (the zone supplied) in accordance with a power supply command signal 113 from the restoration control unit 107. The operation of the power supply unit 106 and clock supply unit 108 will be described later.

The printing unit 101 receives, via the control unit 102, print data that has been transmitted from an external device to the image forming apparatus 100 via the network interface 103 or serial interface 104 and prints on paper by, e.g., an electrophotographic printing method. If the image forming apparatus 100 is provided with an image reader such as a scanner (not shown), the printing unit 101 is used to print the image data read in on paper. The control unit 102 includes a CPU, RAM and ROM (not shown) and may include a large-capacity storage medium such as a hard disk. The control unit 102 also converts image data as well as controlling other components.

The network interface 103 implements an interface with a LAN (Local-Area Network) of 100BaseT construction, by way of example. A plurality of personal computers and servers are connected on the network, and print requests from devices on the network are received by the image forming apparatus 100 via the network interface 103. Further, not only print requests but also communication for monitoring the status of the image forming apparatus 100 is performed via the network interface 103. The contents of these communications are interpreted by the CPU within the control unit 102.

The serial interface 104, which is an interface such a USB interface, usually is for implementing connection to several external devices and does not afford a connection configuration as broad as that of a network. It is possible to connect a modem or the like (not shown) and implement facsimile communication. Further, if a modem or the like is internal, then the image forming apparatus 100 can be used as a facsimile apparatus. It is assumed in this embodiment that a modem has been connected to the serial interface 104 and that the image forming apparatus 100 is used as a facsimile apparatus.

The console 105 is operated by the user and can input operation requests to the image forming apparatus 100. In an arrangement in which a copy function is implemented by equipping the image forming apparatus 100 with a scanner (not shown), the image forming apparatus 100 can be instructed to perform a copy operation by operating the console 105. The console 105 is an interface for entering an operation request from the user and hence there are instances where it is also referred to as "interface 105" in the description that follows. Further, the term "interface" in the present invention refers to the console 105 as well.

The network interface 103, serial interface 104 and console 105 are connected to the control unit 102 via an internal bus 109, and data and a processing request command received from each interface are delivered to the control unit 102. Further, the control unit 102 is also capable of transmitting data and the like to external equipment via the network interface 103 and serial interface 104. The interfaces 103 to 105 output the restoration request signals 116 to 118, respectively, in accordance with externally applied signal inputs. More specifically, in a case where data has been received from a computer terminal on a LAN and the image forming apparatus 100 is in a power save mode, described later, the network interface 103 transmits the restoration request signal 116.to the restoration control unit 107. Further, in a case where data has been received from an external facsimile apparatus via modem and the image forming apparatus 100 is in the power save mode, the serial interface 104 transmits the restoration request signal 117 to the restoration control unit 107. Further, in a case where a user operation has been sensed and the image forming apparatus 100 is in the power save mode, the console 105 transmits the restoration request signal 118 to the restoration control unit 107.

The power supply unit 106 supplies power to all blocks shown in the FIG. 1. Furthermore, in accordance with a command or the like from the restoration control unit 107, supply and cut-off of power can be carried out block by block or on a per-group basis, in which each group is obtained by collecting several blocks together. In this embodiment, as will be described later, supply/cut-off of power is controlled upon treating the control unit 102 and clock supply unit 108 as one group and treating the printing unit 101 as another group.

The restoration control unit 107 receives the restoration request signals 116 to 118 that have been output from the interfaces 103 to 105 in accordance with the signals from the external devices or console. In accordance with the received restoration request signals 116 to 118, the restoration control unit 107 outputs the power supply command signal 113 and clock selection signal 114 to the power supply unit 106 and clock supply unit 108, respectively, thereby controlling the operating mode when recovery is made from the power save mode. It should be noted that a restoration request signal (not shown) from an internal device of the image forming apparatus 100 also is input to the restoration control unit 107. An example of an internal device of the image forming apparatus 100 is a timer for outputting the restoration request signal in response to elapse of a prescribed period of time. In regard to causing the image forming apparatus 100 to transition to the power save mode, the user of the image forming apparatus 100 sets a time (e.g., 8:00 AM tomorrow) at which the normal power supply mode is restored from the power save mode in the timer via the console 105. The timer measures time and transmits the restoration request signal to the restoration control unit 107 if the result of time measurement is that the set time (e.g., 8:00 AM tomorrow) has been reached.

Furthermore, the restoration control unit 107 is connected to the control unit 102 by the internal bus 109. This means that the operating mode at the time of recovery from the power save mode can be set in advance. By changing this setting, the operating mode based upon the restoration request from the external interfaces 103, 104 or console 105 can be changed in dependence upon the network environment in which the user or image forming apparatus 100 has been incorporated. This embodiment exemplifies a case where either a "print mode" or "storage mode" is capable of being set at the time of facsimile reception (the details will be described later with reference to FIG. 5).

Furthermore, the restoration control unit 107 decides the operating mode in accordance with which of the restoration request signals 116 to 118 enters (i.e., depending upon from which of the interfaces 103, 104 and console 105 the signal enters). In accordance with the operating mode decided, the restoration control unit 107 supplies the power supply command signal 113 to the power supply unit 106 in order to control the power supply unit 106. Similarly, in accordance with the operating mode decided, the restoration control unit 107 supplies the clock supply unit 108 with the clock selection signal 114 that specifies the frequency of the clock that operates the control unit 102.

The clock supply unit 108 includes a source-clock generator such as an oscillator, a plurality of clock generating circuits for generating a plurality of clocks of different frequencies based upon the source clock, and a clock selection circuit for selecting the clock supplied to the control unit 102. On the basis of the clock selection signal 114 from the restoration control unit 107, the clock selection circuit selects the clock supplied to the control unit 102. The clock selected is supplied to the control unit as clock 115.

Although the power supply unit 106 supplies power to each of the above-mentioned components in the image forming apparatus 100, supply and cut-off of power to several of these is controlled by the power supply command signal 113 from the restoration control unit 107. In FIG. 1, two types of power are illustrated as being supplied by the power supply unit 106. First power 110 is supplied to the control unit 102 and clock supply unit 108, and second power is supplied to the printing unit 101. It should be noted that other blocks also are supplied with power from the power supply unit 106 as a matter of course. It is assumed here that control of supply/cut-off of power to these other blocks is not particularly carried out. Supply of power to these other blocks is not illustrated in order to simplify the drawing.

As described above, the restoration control unit 107 is such that the clock selection signal 114 and power supply command signal 113 are decided in dependence upon which of the restoration request signals 116 to 118 has entered. FIG. 6 is a diagram illustrating the relationship between the input signals (restoration request signals) and output signals (power supply command signal 113 and clock selection signal 114) of the restoration control unit 107 in this embodiment. The operation of the restoration control unit 107 illustrated in FIG. 6 will be evident from a description of restoration processing rendered below with reference to the flowcharts of FIGS. 2 to 5.

The operation of the image forming apparatus 100 having the structure set forth above will now be described with reference to the flowcharts of FIGS. 2 to 5.

Figure 2:
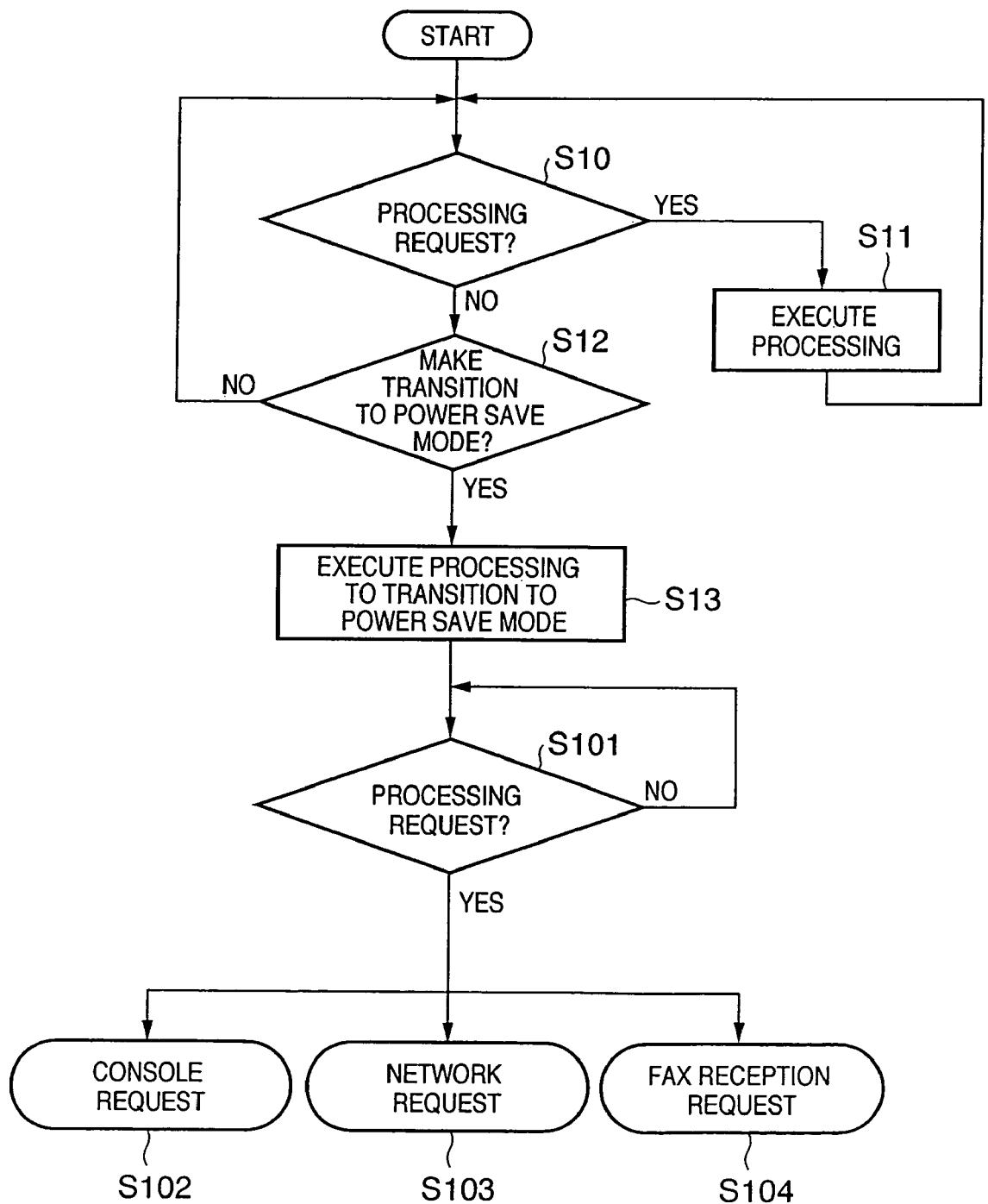
FIG. 2 is a flowchart useful in describing transition from normal operation to a power save mode and operation for starting recovery from the power save mode in the image forming apparatus in accordance with the embodiment of the present invention.
Figure 7:
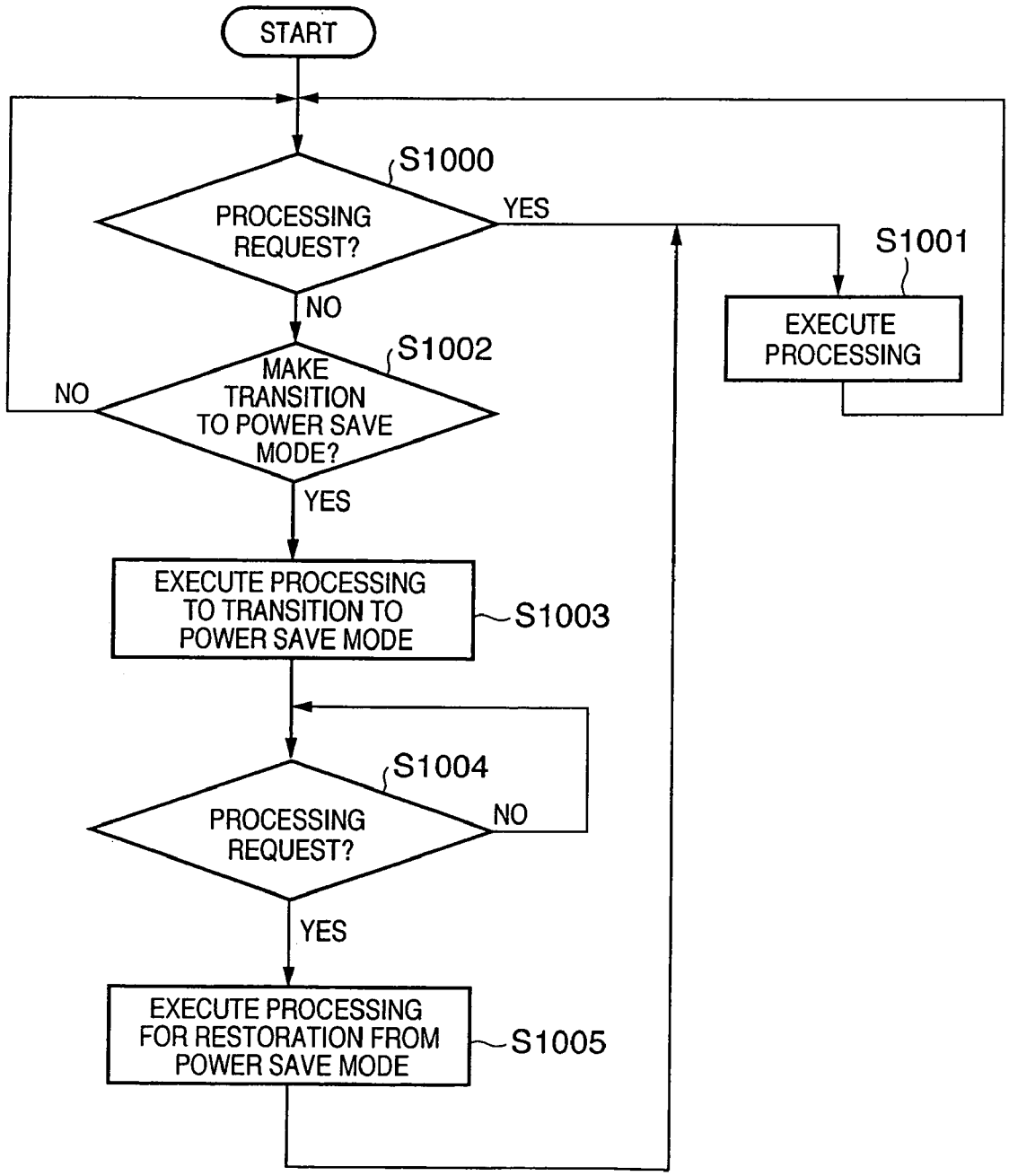
FIG. 7 is a flowchart useful in describing operation for recovery from the power save mode according to an example of the prior art.

FIG. 2 is a flowchart illustrating start of transition from the normal power supply mode to the power save mode and restoration from the power save mode in accordance with the restoration request signal. Operation at the time of the normal power supply mode is similar to that described in the example of the prior art of FIG. 7. That is, at step S10 in FIG. 2, the control unit 102 waits for a processing request (print request) from an apparatus (a computer terminal on the LAN or facsimile apparatus connected to the modem) external to the image forming apparatus or from the console 105. If the setting is such that a transition to the power save mode is made in a case where there is no processing request over a fixed period of time, then the timer for measuring the period of time without a signal input (processing request) from the outside operates within the image forming apparatus. If a processing request of some kind is issued, control proceeds to step S11, at which the control unit 102 executes the requested processing. Control then returns to step S10. At this time the value in the timer that measured the length of time without a processing request is cleared and measurement is re-started from the moment the requested processing ends.

At step S12, the control unit 102 refers to the timer value and determines whether a transition to the power save mode should be made. If it is determined that there will be no transition to the power save mode (i.e., if the timer value has not attained a prescribed time), then control returns to step S10. If there is no input of a processing request over the prescribed period of time (i.e., if the timer value indicates elapse of the prescribed time), then it is determined at step S12 to make a transition to the power save mode. Then, at step S13, processing for transitioning to the power save mode is executed. For example, the control unit 102 executes processing for saving required data from a DRAM to a non-volatile storage medium such as a hard disk and supply of power to part of the image forming apparatus 100 is halted. In this embodiment, the control unit 102 instructs the restoration control unit 107 to cut off the supply of power 110, 111 from the power supply unit 106 and stops the supply of power to the printing unit 101, control unit 102 and clock supply unit 108.

Thus, as set forth above, the control unit 102 is shut down (supply of power thereto is turned off) when the transition to the power save mode is completed at step S13. That is, steps S10 to S13 represent control by the control unit 102, and steps S101 to S104 indicate processing by the restoration control unit 107.

In this embodiment, as set forth above, control of power when the transition is made to the power save mode is carried out in response to the restoration control unit 107 being requested by the control unit 102 to shut down power. That is, in response to a command from the control unit 102, the restoration control unit 107 outputs the power supply command signal 113 to the power supply unit 106 to cut off power 110 supplied to the printing unit 101 and power 111 supplied to the control unit 102 and clock supply unit 108.

At step S101, the restoration control unit 107 determines whether a processing request has entered via the network interface 103, serial interface 104 or console 105 illustrated in FIG. 1. In this embodiment, this determination is made by monitoring the restoration request signals 116 to 118. If there is no processing request, control stays at step S101.

If there is a user input of some kind (or a prescribed user input) via the console 105, then the restoration request signal 118 from the console 105 is input to the restoration control unit 107 and control shifts from step S101 to step S102. If there is a processing request (a communication request of some kind) to the network interface 103, then the restoration request signal 116 is input to the restoration control unit 107 and control proceeds to step S103. Furthermore, if there is a processing request from a functional block [(e.g., a facsimile (FAX) function block (not shown)] that has been connected to the serial interface 104, the restoration request signal 118 is input to the restoration control unit 107 and control proceeds to step S104.

It should be noted that in a case where a plurality of the restoration request signals have been generated simultaneously, it will suffice if control transitions to any of steps S102 to S104 in accordance with predetermined order of priority.

Figure 3:
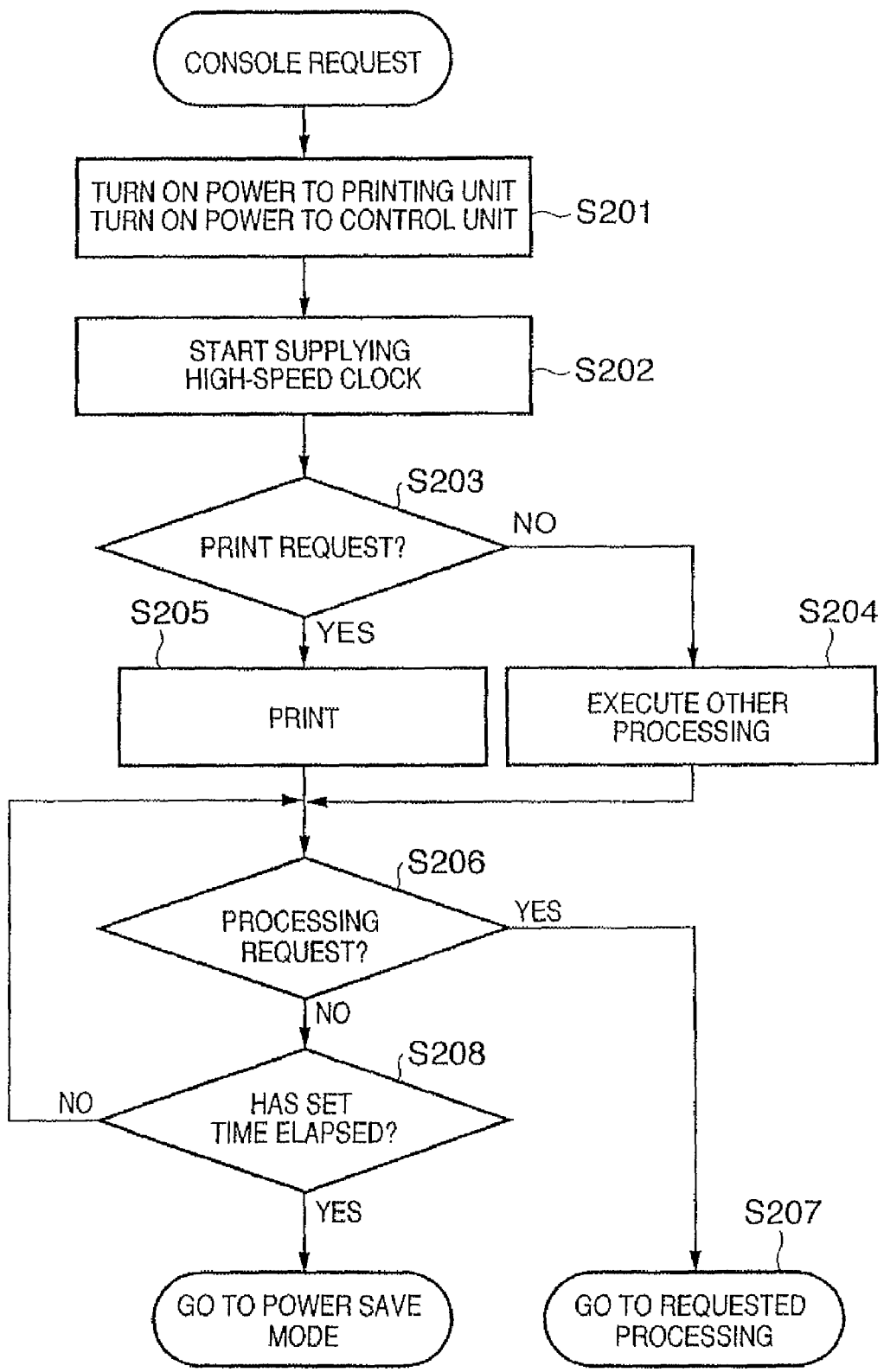
FIG. 3 is a flowchart useful in describing operation for recovery from the power save mode in the image forming apparatus in accordance with the embodiment of the present invention.

FIG. 3 is an operation flowchart in a case where control has transitioned to step S102 in response to the restoration request signal 118 from the console 105. In this case, the power supply command signal 113 that specifies activation (ON) of power 110 and power 111 and the clock selection signal 114 for selecting the high-speed clock are output from the restoration control unit 107, as illustrated in FIG. 6.

At step S201 in FIG. 3, the restoration control unit 107 uses the power supply command signal 113 to instruct the power supply unit 106 to start the supply of power 111 to the printing unit 101 and the supply of power 110 to the control unit 102 and clock supply unit 108. In response to the power supply command signal 113, the power supply unit 106 starts supply of power 111 and power 110. Next, at step S202, the restoration control unit 107 uses the clock selection signal 114 to instruct the clock supply unit 108 to select the high-speed clock. In response to being so instructed, the clock supply unit 108 outputs a high-frequency (high-speed) clock, from among the generated plurality of clocks, as the clock 115. The control unit 102 supplied with power 110 and the clock 115 restores the data, etc., which has been saved in the non-volatile memory, in the RAM and resumes operation. The control unit 102 is supplied with the high-speed clock and performs high-speed operation. As a result, a processing request from a user via the console 105 can be processed at high speed.

Processing from step S203 onward is executed by the control unit 102, which has been restored to operation. At step S203, the control unit 102 discriminates the content of the processing request from the user. If the processing request is a print request, control proceeds to step S205. If the processing request is some other request, then control transitions to step S204. Processing conforming to the entered processing request is executed by the control unit 102 at step S204. Since supply of power to the printing unit 101 has already started at step S201, the control unit 102 causes the printing unit 101 to perform the requested printing at step S205 upon completion of preparations for printing in the printing unit 101.

When print processing at step S205 or other processing at step S204 ends, control proceeds to step S206. Here the control unit 102 checks to determine that there is no other processing request. If another processing request exists, control proceeds to step S207 and the requested processing is executed. That is, control returns to step S203 and processing corresponding to the processing request is executed. If there is no other processing request, then, at step S208, reference is had to the timer that measures time for transition to the power save mode and control returns to step S206 if the set time has not elapsed. If the set time has elapsed, however, then a transition to the power save mode is made. That is, if a processing request has not been issued over the set period of time, then control returns to step S13 in FIG. 2 and the transition to the power save mode is made.

It should be noted that in the description rendered above, power control at step S201 and clock control at step S202 is performed at separate steps, although it is obvious that these control operations may be performed at the same step or in an order that is the reverse of that described.

Thus, as set forth above, if there is a processing request from the console 105, supply of power to the printing unit 101, control unit 102 and clock supply unit 108 is started immediately and the high-speed clock is supplied to the control unit 102. As a result, the image forming apparatus 100 is capable of operating in such a manner that the user who applied the processing request via the console 105 is made to wait for processing as little as possible. That is, if the user performs an operation in the power save mode, the user can be relieved of the stress that accompanies a decline in processing speed.

Figure 4:
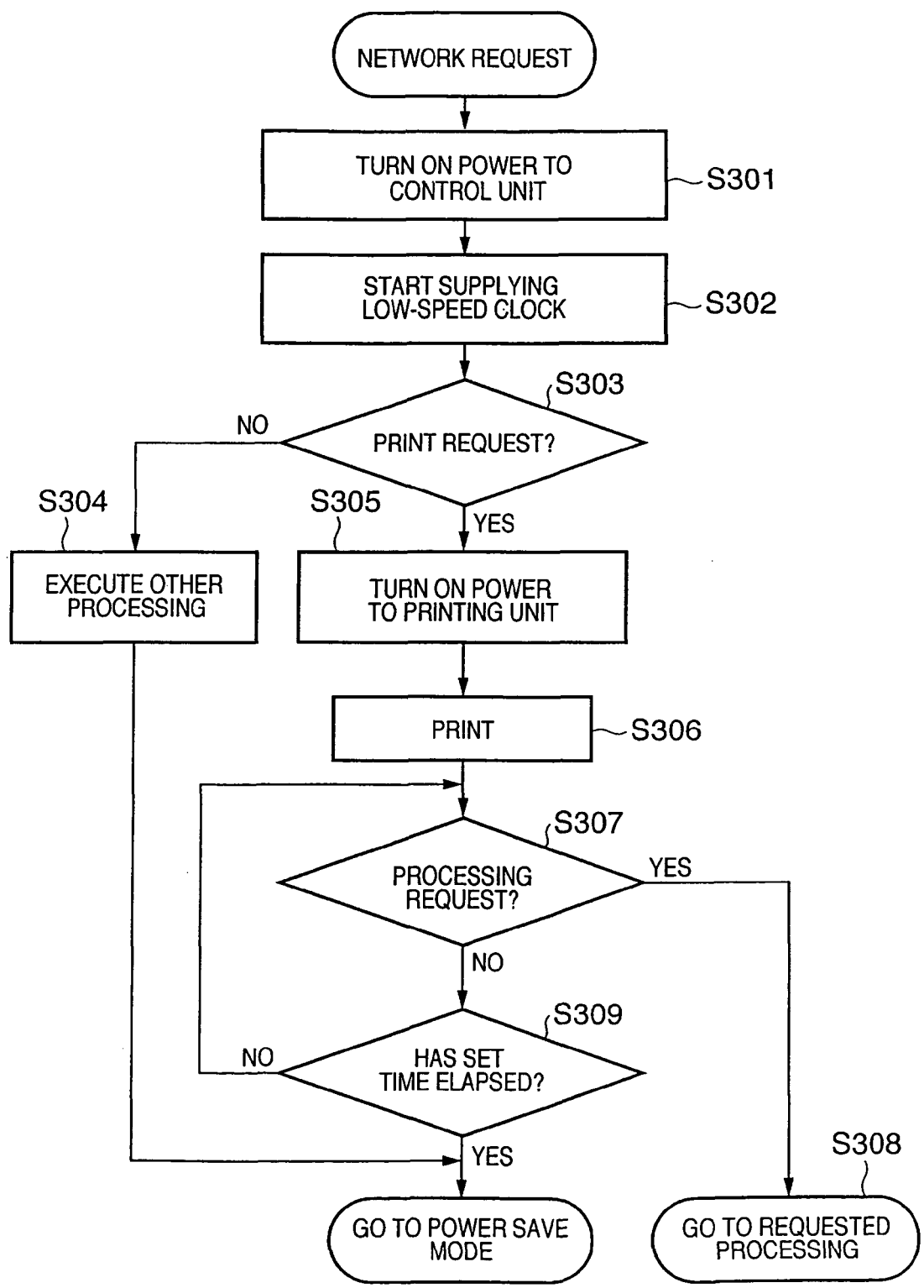
FIG. 4 is a flowchart useful in describing operation for recovery from the power save mode in the image forming apparatus in accordance with the embodiment of the present invention.

Next, reference will be had to the operation flowchart of FIG. 4 to describe processing that follows a transition to step S103 in response to the restoration request signal 116 from the network interface 103 if such a transition has been made. In this case, the restoration control unit 107 outputs the power supply command signal 113 that turns power 110 ON and turns power 111 OFF, and the clock selection signal 114 that selects the low-speed clock, as illustrated in FIG. 6.

At step S301 in FIG. 4, the restoration control unit 107 uses the power supply command signal 113 to instruct the power supply unit 106 to start the supply of power 110 to the control unit 102 and clock supply unit 108. In response to being so instructed, the power supply unit 106 starts supplying power 110. At this time the supply of power 111 to the printing unit 101 remains cut off. At step S302, the restoration control unit 107 uses the clock selection signal 114 to instruct the clock supply unit 108 to select the low-speed clock. In response to being so instructed, the clock supply unit 108 outputs a low-frequency (low-speed) clock, from among the generated plurality of clocks, as the clock 115. The control unit 102 supplied with the low-speed clock has a slow processing speed but operates with little consumption of power. Power 111 to the printing unit 101 remains cut off. Consequently, when the image forming apparatus 100 has been caused to resume operation by the signals from the restoration control unit 107 at steps S301 and S302, the power consumption of the image forming apparatus 100 at this time is slightly greater than in the power save mode but is much less in comparison with that at the time of normal operation (i.e., when the normal power supply mode is in effect).

The control unit 102 supplied with power 110 and with the clock 115 restores the data, etc., which has been saved in the non-volatile memory, in the RAM and resumes operation. Processing from step S303 onward is executed by the control unit 102, which has been restored to operation.

The content of the restoration request signal 116 from the network interface 103 is discriminated by the control unit 102 at step S303. If the request is a print request, control proceeds from step S303 to step S305. If the restoration request signal 116 is a processing request other than for printing, control proceeds to step S304. Here the control unit 102 executes processing conforming to the processing request.

If it is determined at step S303 that the request is a print request, then control proceeds to step S305. Here the control unit 102 notifies the restoration control unit 107 of the print request via the internal bus 109. In response to being notified of the print request, the restoration control unit 107 uses the power supply command signal 113 to instruct the power supply unit 106 to begin supplying power 111 to the printing unit 101. Furthermore, the restoration control unit 107 uses the clock selection signal 114 to instruct the clock supply unit 108 to select the high-speed clock. In response to being so instructed, the clock supply unit 108 outputs the high-frequency (high-speed) clock, instead of the low-speed clock supplied until now, as the clock 115. The control unit 102 supplied with the high-speed clock performs high-speed operation and therefore the print request issued from the network interface 103 can be processed at high speed. When preparations for operating the printing unit 101 are completed subsequently, the control unit 102 sends the printing unit 101 the processed print data received from the network interface and print processing is executed at step S306.

When print processing at step S306 ends, control proceeds to step S307. The processing of steps S307 to S309 is identical with the processing of steps S206 to S208.

If the processing request discriminated at step S303 is not a print request, e.g., if notification of the status of the image forming apparatus 100 has been requested, then only the requested processing is executed at step S304. At this time, power to the printing unit 101 remains cut off and the control unit 102 that executes processing also operates at the low-speed clock. Accordingly, the power consumption at this time is slightly greater than in the power save mode but is much less in comparison with that at the time of normal operation (i.e., when the normal power supply mode is in effect). When the processing of step S304 ends, the power save mode is restored immediately.

Thus, as set forth above, the control unit 102 functions as interpreting means for interpreting the content of data transmitted from an external apparatus and received by the network interface 103. If the received data is print data, a printing function of printing means for executing print processing that is based upon the print data is implemented owing to cooperation between the control unit 102 and printing unit 101. In addition, operating-status control means for exercising control in such a manner that the control unit 102 serving as the interpreting means is placed in an active state or inactive state is implemented by cooperation between the control unit 102 and restoration control unit 107. That is, the operating-status control means formed by the control unit 102 and restoration control unit 107 causes the interpreting means (control unit 102), which is in the inactive state, to transition to a first operating state in response to receipt of data by the network interface 103 (S301, S302). The operating-status control means causes the interpreting means (control unit 102) to transition from the first operating state to a second operating state in which power consumption is greater in response to an interpretation by the interpreting means (control unit 102) that the content of the received data is print data (S303, S305).

Further, as described above with reference to FIG. 3, an operation request from the user to the image forming apparatus 100 can be input from the console 105 as input means in the power save mode. In accordance with the input of this operation request, the restoration control unit 107 that constructs part of the operating-status control means causes the interpreting means (control unit 102) in the inactive state to transition to the second operating state and not the first operating state. Here the first operating state of the interpreting means (control unit 102) refers to, e.g., operation based upon the low-speed clock, and the second operating state refers to, e.g., operation based upon a clock the speed of which is higher than that of the low-speed clock.

Thus, as set forth above, if there is a processing request from the network interface 103, first power starts to be supplied solely to the control unit 102 and clock supply unit 108, and the clock supplied to the control unit 102 is low-speed clock. Consequently, discrimination of a processing request from the network interface 103 is performed with a power consumption much less than that at the time of normal operation. If the result of such discrimination is that the request is not a print request, then power to the printing unit 101 remains cut off and operation is such that the requested processing is executed with the control unit 102 in the state of low power consumption (based upon the low-speed clock) and the power save mode is restored immediately upon the end of processing. This makes it possible to provide an image forming apparatus 100 of low power consumption even if processing other than print processing requested via the network interface 103 occurs frequently. Thus, in the event that an externally applied processing request is detected when the power save mode is in effect, the power consumed by the control unit that operates in order to discriminate the content of the request can be reduced (i.e., the power-saving effect can be maintained).

Figure 5:
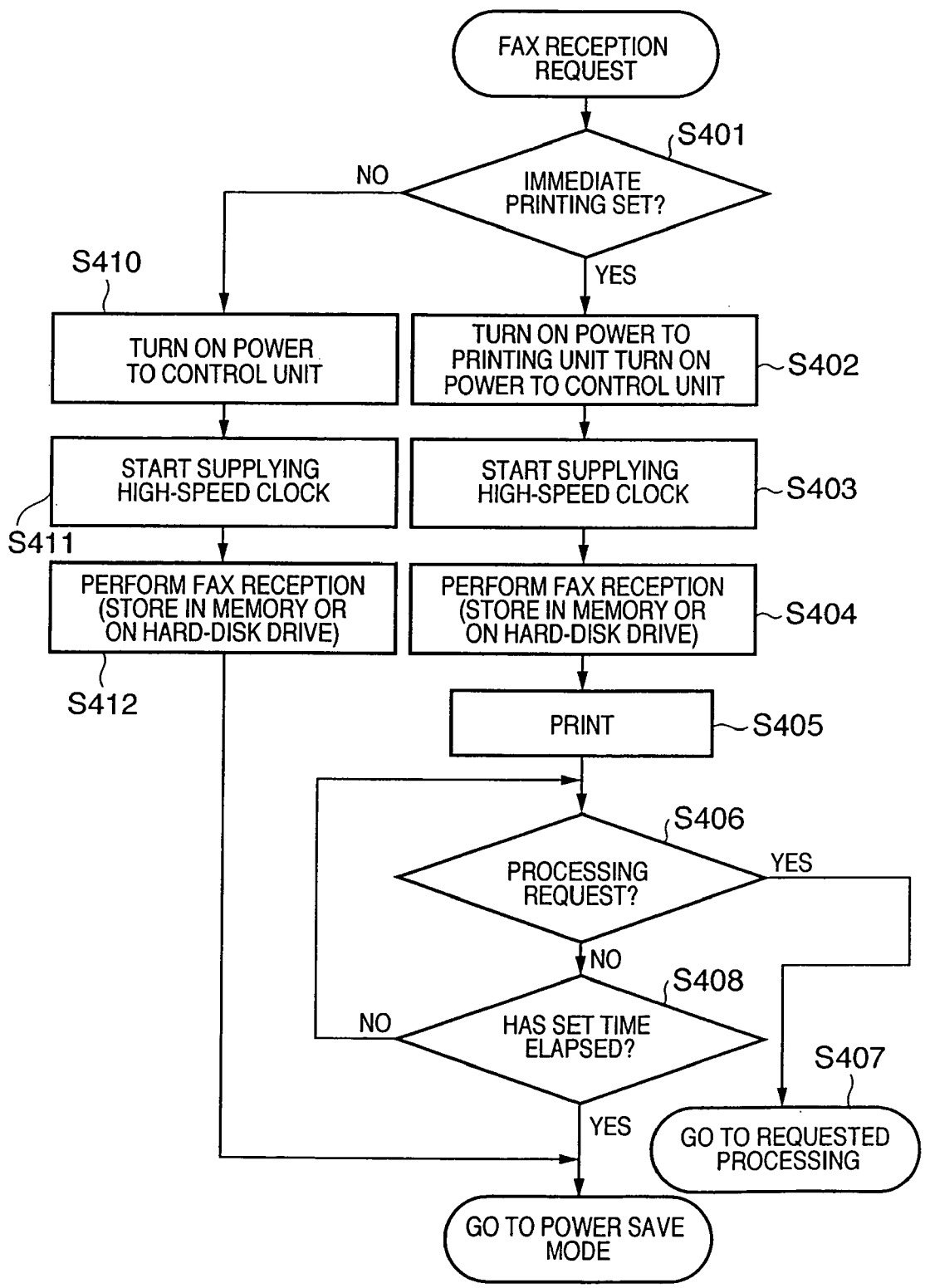
FIG. 5 is a flowchart useful in describing operation for recovery from the power save mode in the image forming apparatus in accordance with the embodiment of the present invention.

Next, reference will be had to the flowchart of FIG. 5 to describe processing that follows a transition to step S104 in response to a FAX reception request from the serial interface 104 if such a transition has been made.

Fax reception methods have been set beforehand in the restoration control unit 107 from the control unit 102 via the internal bus 109. In this example, it is assumed that it is possible to selectively set either a "print mode" in which printing is performed immediately upon receipt of print data, or a "storage mode" in which the received data is stored in a memory or hard disk (not shown but included in the control unit 102) and starts being printed in response to a command from the user. These fax reception methods are specified by user operation at the console 105, and the mode specified is set in the restoration control unit 107 by the control unit 102.

When the restoration request signal 117 is received, the restoration control unit 107 outputs the power supply command signal 113, which turns ON power 110 and power 111, and the clock selection signal 114, which selects the high-speed clock, if the "print mode" has been set, as illustrated in FIG. 6. If the "storage mode" has been set, then the restoration control unit 107 outputs the power supply command signal 113, which turns ON power 110 and holds power 111 in the OFF state, and the clock selection signal 114 that selects the high-speed clock.

In FIG. 5, the restoration control unit 107, which has sensed a processing request from the serial interface 104, checks the set fax reception method at step S401. If the print mode has been set, then control proceeds to step S402. Here the restoration control unit 107 notifies the power supply unit 106, via the power supply command signal 113, so as to start supply of power 111 to the printing unit 101 and supply of power 110 to the control unit 102 and clock supply unit 108. In response to being so instructed, the power supply unit 106 starts supplying power 111 and power 110. Next, at step S403, the restoration control unit 107 uses the clock selection signal 114 to instruct the clock supply unit 108 to select the high-speed clock. Upon being so instructed, the clock supply unit 108 supplies a high-frequency (high-speed) clock, from among the plurality of clocks generated, to the control unit 102 as the clock 115. At this stage the control unit 102 can resume operation. Since the control unit 102 supplied with the high-speed clock operates a high speed, the processing request from the serial interface 104 can be processed at high speed.

Steps S404 to S407 are executed by the control unit 102, which has been restored to operation. At step S404, the control unit 102 performs fax reception and stores the data in the memory within the control unit 102 or on a hard disk. At the end of reception, the control unit 102 executes print processing immediately using the printing unit 101 at step S405.

When print processing at step S405 ends, control proceeds to step S406. The processing of steps S406 to S408 is identical with the processing of steps S206 to S208.

If it is determined at step S401 that the storage mode has been set, on the other hand, then control proceeds to step S410. Here the restoration control unit 107 uses the power supply command signal 113 to instruct the power supply unit 106 to start the supply of power 110 to the control unit 102 and clock supply unit 108. Upon being so instructed, the power supply unit 106 starts supply of power 110.

Next, at step S411, the restoration control unit 107 instructs the clock supply unit 108 via the clock selection signal 114 to select the high-speed clock. Upon being so instructed, the clock supply unit 108 outputs the high-frequency (high-speed) clock, from among the plurality of clocks generated, as the clock 115. Since the control unit 102 supplied with the high-speed clock performs a high-speed operation, the processing request from the serial interface 104 is capable of being processed at high speed. Next, fax reception processing is executed by the control unit 102 at step S412. The received data is stored in the memory within the control unit 102 or on a hard disk. When fax reception ends, the fact that fax-storage reception has been performed is displayed on, e.g., the display unit of the console 105, by the control unit 102 and then control returns to the power save mode.

Thus, as set forth above, if data transmitted from an external apparatus is received by the image forming apparatus 100 via the serial interface 104, the restoration control unit 107, which constructs part of the operating-status control means mentioned above, causes the interpreting means (control unit 102) in the inactive state to transition to the second operating state (operation based upon the high-speed clock) and not to the first operating state (operation based upon the low-speed clock) in response to reception of the data.

If a fax-receive request has been received from the serial interface 104 in the power save mode, operation for recovery from the power save mode is changed over appropriately in accordance with the fax operating mode (print mode or storage mode), as mentioned above. In accordance with the example set forth above, supply of power to the printing unit 101, control unit 102 and clock supply unit 108 is started immediately if the print mode has been set as the fax operating mode. Following the end of fax reception, therefore, printing can be performed immediately upon completion of preparations in the printing unit 101. If the storage mode has been set, on the other hand, power to the printing unit 101 remains cut off. As a result, fax reception can be performed in a state in which power consumption is low.

Further, it is obvious that the restoration control unit 107 can be constituted by a logic circuit that implements the relationship between input and output signals depicted in FIG. 6. Such a logic circuit can be realized by a very simple arrangement and exhibits very little power consumption even if power is supplied to the restoration control unit 107 at the time of the power save mode.

Further, the interfaces that generate the restoration request signals are not limited to those mentioned above, and wireless interfaces, etc., can also be applied.

As described above, the image forming apparatus according to the foregoing embodiment has the normal power supply mode and power save mode and, in addition, power supply modes of a plurality of types in which the power-consumption states differ, these being a power supply mode in which power is not supplied to the printing unit 101, and power supply modes of different clock frequencies. That is, the image forming apparatus is capable of operating in a plurality of types of power supply modes in which the power-consumption states differ from each other. Consequently, in the operation for restoration from the power save mode, the image forming apparatus can make a transition to any power supply mode, from among the above-mentioned plurality of types of power supply modes, in which power consumption is greater than that in the power save mode but less than that in the normal power supply mode. To which power supply mode the transition is made is in accordance with which external interface inputs the restoration request signal to the apparatus. That is, the foregoing embodiment is such that in accordance with requests from a plurality of external interfaces to effect restoration from the power save mode, the image forming apparatus can be restored in an ideal operating state and, moreover, in a state of low power consumption that conforms to the external interface that requested restoration. This makes it possible to provide an image forming apparatus that consumes less power.

Consumption of power can be reduced further by performing an operation in addition to that of the foregoing embodiment, namely by controlling the voltage of power 110 that the power supply unit 106 supplies to the control unit 102. For example, if the low-speed clock is supplied in the foregoing embodiment, the voltage of power supplied to the control unit 102 is made less than that at the time of normal operation, thereby enabling a more enhanced power-saving effect.

While the present invention has been described with reference to exemplary embodiments, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2005-295556, filed Oct. 7, 2005, which is hereby incorporated by reference herein in its entirety.

What is claimed is:

1. A printing apparatus comprising:
    a first receiving unit adapted to receive data transmitted from an external apparatus;
    a printing unit adapted to execute print processing based upon print data if the print data has been received by the first receiving unit;
    a first control unit adapted to perform an interpretation processing for interpreting whether content of data received by the first receiving unit is a print request for requesting the print processing, and to perform a processing based on the print request;
    a clock supply unit adapted to supply an operating clock to the first control, Unit, the operating clock for causing the first control unit to be operated; and
    a second control unit adapted to control a clock frequency of the operating clock supplied by the clock supply unit;
    wherein the second control unit controls the clock supply unit not to supply the operating clock to the first control unit in a case where the printing apparatus is in an inactive state,
    wherein in response to receipt of data by the first receiving unit while the printing apparatus is in the inactive state, the second control unit causes the clock supply unit to supply the operating clock of a first frequency to the first control unit, for causing the first control unit to perform the interpretation processing, and
    wherein, in a case where the first control unit interprets that the received data is the print request, the second control unit, in response to a notification from the first control unit, causes the clock supply unit to supply the operating clock of a second frequency to the first control unit, for causing the first control unit to perform the processing based on the print data, the second clock frequency being higher than the first clock frequency.

2. The apparatus according to claim 1, wherein in a case where the first control unit interprets that the received data is not the print request, the second control unit causes the clock supply unit not to supply the operating clock to the first control unit.

3. The apparatus according to claim 1, further comprising a power supply unit adapted to supply power to the clock supply unit;
    wherein the second control unit controls the power supply unit not to supply power to the clock supply unit in a case where the printing apparatus is in the inactive state.

4. The apparatus according to claim 1, wherein the first receiving unit receives print data from an external apparatus on a network via the network.

5. The apparatus according to claim 1, further comprising a second receiving unit adapted to receive data transmitted from an external apparatus;
    wherein in response to receipt of data by the second receiving unit while the Printing apparatus is in the inactive state, the second control unit causes the clock supply unit to supply the operating clock of the second frequency to the first control unit.

6. The apparatus according to claim 5, wherein the second receiving unit receives facsimile data from a facsimile apparatus.

7. The apparatus according to claim 1, further comprising an input unit adapted to input an operation request from a user to the printing apparatus;
    wherein in response to input of an operation request from the user via the input unit while the printing apparatus is in the inactive state, the second control unit causes the clock supply unit to supply the operation clock of the second frequency to the first control unit.

8. A method of controlling a printing apparatus having: a printing unit adapted to execute print processing based upon print data received from an external apparatus; a first control unit adapted to perform an interpretation processing for interpreting whether content of received data is a print request for requesting the print processing, and to perform a processing based on the print request; a clock supply unit adapted to supply an operating clock to the first control unit, the operating clock for causing the first control unit to be operated; and a second control unit adapted to control a clock frequency of the operating clock supplied by the clock supply unit, the method comprising:

a receiving step of receiving data transmitted from the external apparatus;

a first control step of causing the clock supply unit to supply the operating clock of a first frequency to the first control unit, for causing the first control unit to perform the interpretation processing in response to receipt of data at the receiving step while the printing apparatus is in an inactive state;

a determination step of determining whether content of the data received at the receiving step is the print request, based on the interpretation processing performed by the first control unit; and a second control step of causing, in a case where the determination step determines that the content of the received data is the print request, the clock supply unit to supply the operating clock of a second clock frequency to the first control unit, for causing the first control unit to perform the processing based on the print data, the second clock frequency being higher than the first clock frequency.

* * * * *